Sept. 11, 1962 K. RASCHIG ET AL 3,053,081
METHOD AND APPARATUS FOR TESTING THE
PROPERTIES OF PLASTIC MATERIALS
Filed Sept. 25, 1959 3 Sheets-Sheet 1
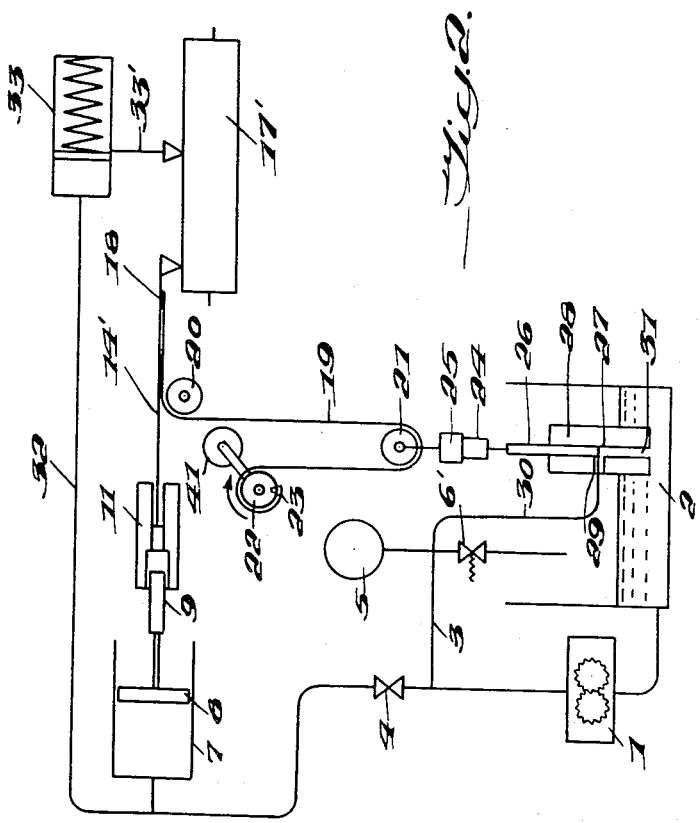
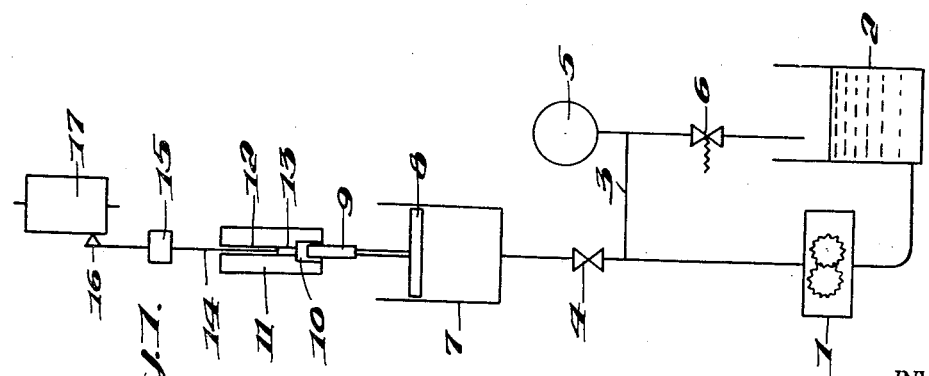
INVENTORS
KLAUS RASCHIG,
THEODOR BUNGARTZ,
BY
Bailey, Stephens & Huettig
ATTORNEYS

INVENTORS
KLAUS RASCHIG,
THEODOR BUNGARTZ,

BY Bailey, Stephens & Huettig
ATTORNEYS

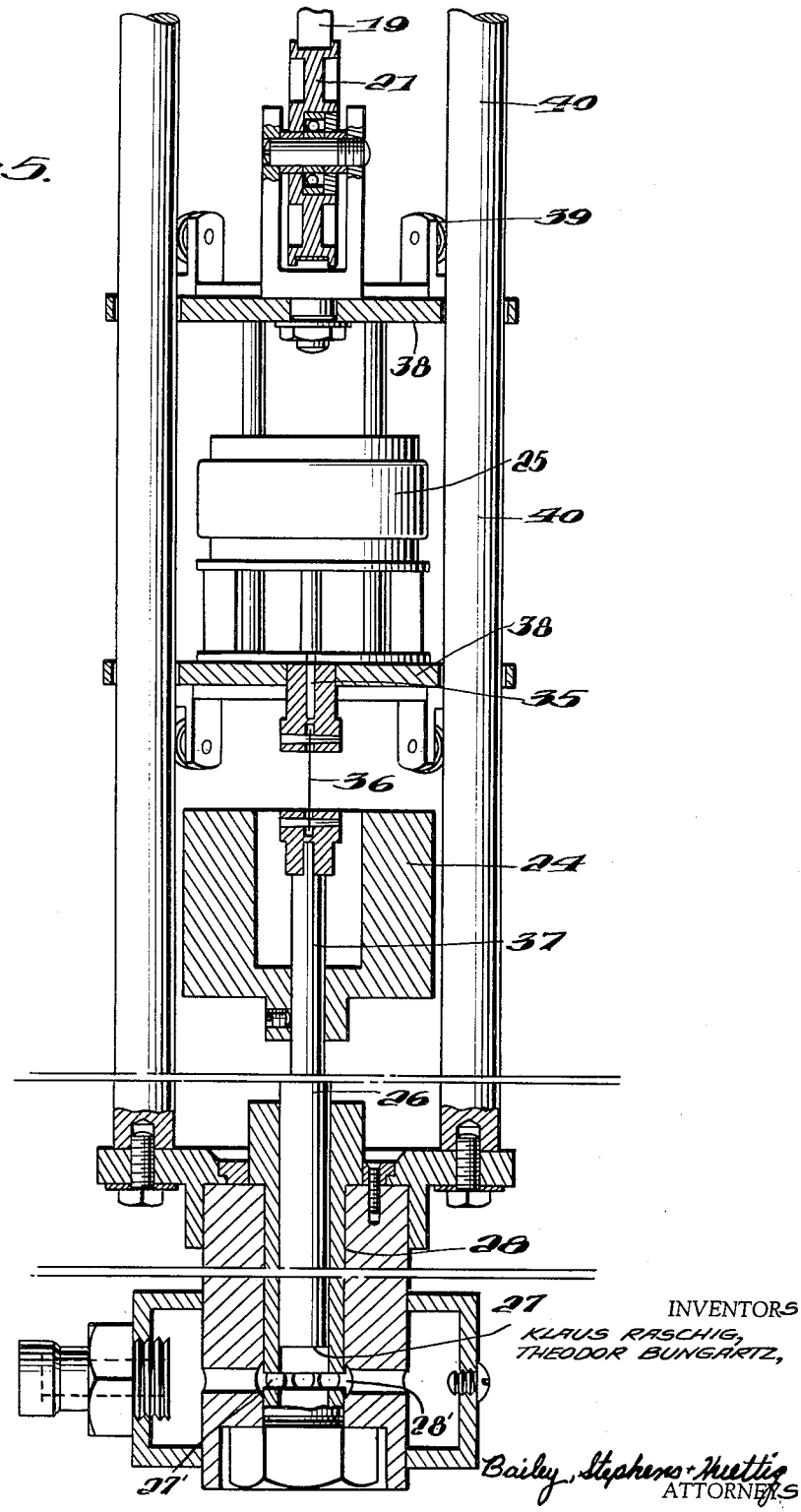

United States Patent Office 3,053,081
Patented Sept. 11, 1962

3,053,081
METHOD AND APPARATUS FOR TESTING THE PROPERTIES OF PLASTIC MATERIALS
Klaus Raschig and Theodor Bungartz, Ludwigshafen (Rhine), Germany, assignors to Dr. F. Raschig G.m.b.H., Ludwigshafen (Rhine), Germany
Filed Sept. 25, 1959, Ser. No. 842,411
11 Claims. (Cl. 73—150)

The invention relates to the testing of plastic materials, and more particularly to an improvement on the so-called "flow-test method," as well as an apparatus for carrying out this improved method.

In the usual flow test method of testing plastics, a predetermined volume of a plastic mass is placed at room temperature in the cylindrical space of a press mold heated to a predetermined temperature and immediately, or after a definite preheating, is pressed with constant pressure by a press punch into a narrow cylindrical or prismatic flow channel and there pushes against an easily movable, weight loaded piston, the extension of which carries a marking device which marks a distance-time diagram on a drum or the like.

The known apparatus for this method often represent a good means for determining the softening ability of a plastic mass through the flow-test curve, but have the disadvantage that often additional tests with varying selected constant pressure are necessary and that it is difficult to determine the hardening characteristics of the mass.

The primary object of the present invention is to provide a method of testing the properties of plastics which is of more general utility and more certain in its results than the previously known methods.

Another object of the invention is to provide an improved type of apparatus for carrying out this method.

Still a further object of the invention is to provide for testing plastic materials in such a way that the information necessary can be obtained in a single test.

In general, the method described herein consists of varying the pressure applied to the plastic mass according to a predetermined law for the flow speed and charting a pressure-time curve.

Further objects and advantages of the invention will appear more fully from the following description especially when taken in conjunction with the accompanying drawings, which form a part thereof.

In the drawings:

FIG. 1 shows diagrammatically a conventional apparatus for carrying out the flowing test method;

FIG. 2 shows an apparatus according to the invention;

FIG. 5 is a detail of the apparatus of FIG. 2.

Figure 4:
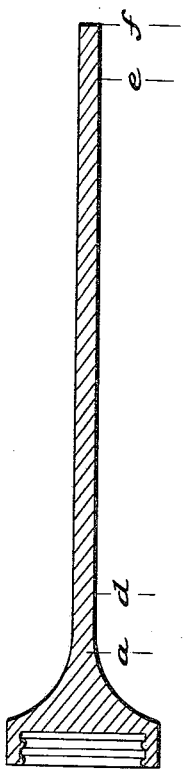
FIG. 4 is a cross-section through the rod of hardened plastic material on an enlarged scale, as it is obtained with the flowing test in the apparatus of FIG. 2.

In the arrangement of FIG. 1, which is a conventional commercial flow-test apparatus, the pressure pump 1 draws the pressure oil from the oil container 2 in excess and feeds it to the pipe 3. The valve 4 is assumed to be closed, and the oil passes to the manometer or pressure guage 5 and through an adjustable overflow valve 6, which serves to maintain the pressure constant, back to the oil container 2. As soon as the constant pressure, which can be determined by the guage 5, is reached, and the mass of material to be tested is inserted in position in the space 10, the valve 4 is opened and the oil under pressure is allowed to flow into the working cylinder 7, so that the pressure piston 9 in the space 10 of the heated press form 11 is driven upwardly by the piston 8 and the mass of plastic engages the piston 13 located in the flow channel 12. The mass then pushes the piston 13 upward, along with its extension 14, the weight 15 and the scriber 16, so that the flow test curve is drawn on the drum 17.

Whereas according to the former procedure the pressure is held constant and the result of the experiment is a distance-time curve, according to the present invention the movement per period of time of the rod extension is varied according to a predetermined program and the variable pressure necessary for this purpose is indicated by a pressure-time curve which then serves to indicate the workability of the mass.

In carrying out the new testing procedure, it is possible to test in a single experiment hardenable plastic masses, even if they soften very substantially when heated, and to determine their hardening properties even in the case of substantial solidification at high pressures. The specific degree of pressure which can be used is in general only limited by the capacity of the apparatus and by the compressive strength of the hardened plastic mass. It is thus possible to determine quite reliably the influence of prolonged standing times on the degree of hardening of the material being tested after complete agreement of the temperature of the mass with the mold temperature. And this determination can be made with very different masses without adjustment of the testing conditions from a single curved path whose original outline provides a good indication of the workability of the mass.

It has been found that, for carrying out the invention, it is advantageous to use a quick working pressure regulator which guarantees the maintenance of the desired distance-time program by using a differential arrangement controlled by the flow movement itself and by a program control member. Basically, any ordinary regulator construction can be used and it is immaterial whether the driving of the pressure piston is mechanical or hydraulic. It is only important that during the course of the testing an automatic rapid regulation should occur and that occurrence of a deviation of the flow movement from the predetermined distance-time program should assure an immediate compensating variation of the pressure. Thus, in a hydraulically operated flow press, a conventional electronic fast regulator can be used together with an overflow valve electronically controlled and connected to the pipe 3.

FIG. 2 shows an example of an apparatus for carrying out the procedure according to the invention. Whereas in the conventional mechanism shown in FIG. 1 the press cylinder, piston and flow mold are arranged perpendicularly, according to the present invention these parts together with the recording drum are preferably arranged horizontally, which results in a simplification of the whole arrangement.

In this modification, in which similar parts carry the same numbers as in FIG. 1, the pressure controlling valve 6' serves to limit the highest pressure which can be produced by the apparatus. The recording drum 17' is of increased length, so that not only the distance-time diagram but also the pressure-time diagram can be recorded on it. The recording of the distance-time diagram is, however, not always entirely necessary, because according to the invention this diagram only reproduces the predetermined movement per unit of time of the flow of the material.

It is, however, advantageous to reproduce the distance-time diagram, because it is possible through it to control the actual maintenance of the regulating program. This also makes it possible in a very simple way by switching over of the apparatus to use it for producing the known flow test curve, from which simultaneously an automatic record of the constant pressure which is used is obtained.

In the form of FIG. 2, the rod 14' has connected to it at 18 a flexible steel band 19 which is guided over a fixed roller 20 and a differential roller 21 and is secured to its other end at 23 to the circumference of a fixed roller 22. The roller 21 carries a weight 24, a synchronous motor 25 and the piston 26 of a piston slide valve. The weight which hangs on the steel band keeps it straight and simultaneously maintains in the flow channel the necessary slight counter pressure. The lower edge 27 of the piston partially covers the free cross-section of several bores 27' arranged in a circle inside the cylinder 28 and connected by a ring channel 28' and opening 29 to a pipe 30 through which the pressure oil in the pipe 3 can flow back to the oil chamber 2 without any substantial counter pressure when the slide valve is fully open.

Through a pipe 32, the oil under pressure in the cylinder 7 is also connected to a pressure sensitive device 33, which by its marker 33' records the pressure-time curve on the drum 17'.

It is apparent that the speed of flow of the plastic mass must be equal to the peripheral speed of the roll 22 which turns in the direction of the arrow, if the differential roll 21 is to remain at the same height. But, because the roll 22 is turned by the program setting mechanism for the predetermined distance-time program of the flow and the piston 26 follows the up and down movement of the differential roller 21, the free cross-section of the oil passage in the slide valve 28 and thus also the oil pressure in the cylinder 7 and the pressure working on the plastic mass to be tested can only remain unchanged if the pressure has the proper value which is necessary at any particular moment to correspond with the predetermined speed of flow.

But, if the plastic mass flows somewhat faster, the roller 21 and the piston 26 will be somewhat raised, since the rod 14' will move faster than the band is unrolled from roll 22, and thus the pressure and simultaneously the speed of flow will be reduced. If the speed of flow drops below the programmed speed, a lowering of the roller 21 takes place which produces an increase in pressure and therewith also an acceleration of the flow. It has been found that it is easily possible with this simple oil pressure regulator to carry out tests which were heretofore found difficult in a wide range of pressures, corresponding, for example, to specific pressures between 50 and 2,000 kg./cm.²

In order to achieve this result, it is naturally important that the piston slide valve should be perfectly machined on its bearing surface and that as a pressure medium a filtered oil of known viscosity be used. The piston edge 27 is advantageously slightly rounded in shape. It is also important during the testing to reduce the friction of the piston, which is accomplished by imparting rotation to the piston 26 through the synchronous motor 25, which can slide up and down in a parallel guiding arrangement without twisting the roller 21.

This arrangement is shown in FIG. 5, where motor 25 by its shaft 35 and strip 36 drives stem 37 of piston 26 on which is mounted weight 24. The block 38 carrying motor 25 is mounted by ball-bearing rollers 39 on two parallel vertical guide rods 40.

The programming device may be a synchronous motor 41 driving roller 22 at a low speed, or may be an arrangement for imparting variable speeds to the roller, such as two such motors connected together through a pair of gears, one of them driving directly the roll 22 and allowing to switch over from one motor to the other at different times.

Figure 3:
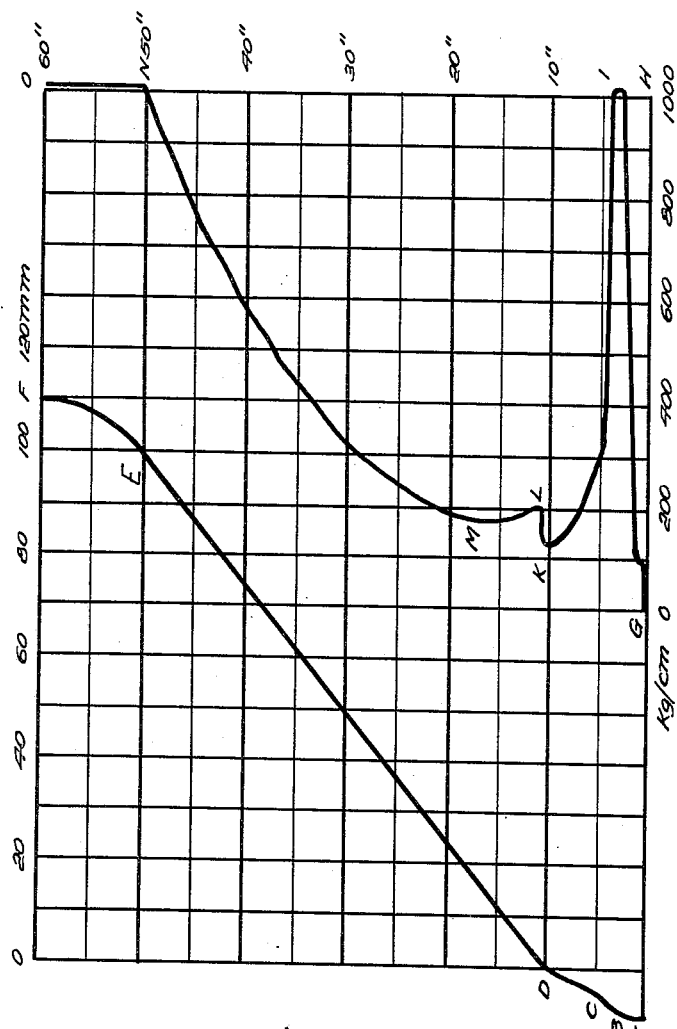
FIG. 3 shows a chart produced by the apparatus of FIG. 2.

The graphic indication of the predetermined distance-time program is in the simplest case a straight line which corresponds to a constant speed of flow. But if two different constant speeds of flow are desired, the program control device can be driven through two synchronous motors of different speeds, so that at a bend in the recorded line a switching over takes place. This is shown for instance at D in FIG. 3, corresponding to the condition when the plastic material has reached the point d in FIG. 4. (The distance a—d in FIG. 4, corresponding to the distance A—D in FIG. 3, is in this example 10 mm.) It is also useful in some cases to have the program line follow a curved path at the beginning of the test, because it is thus possible to avoid even with very strongly flowing masses an excessive pressure requirement during the warming-up period of the mass.

The advantages of the invention can in some cases be used if it is followed during a part of the flow test proceedure and only, for example, follows the carrying out of usual flow test proceedure.

In FIG. 3 the curved path A, B, C, D, E, F is the distance-time curve. It is clear that the preselected program is maintained in the section C, D, E. The small deviation from the program in the section A, B, C is due to the fact that the cold mass has a very high pressure requirement. The curved section E, F which can no longer render inaccurate the test result in the form of the pressure-time curve, is explained in that in the section N, O the upper pressure of the apparatus imposed on the return flow valve 6' is no longer sufficient to cause the considerably hardened pressure mass to flow into the channel with the programmed flow speed.

The entire experimental data, which has been obtained with a phenoplast-wood meal pressing composition, can be determined from the pressure-time curve. The section G, H, I, K, shows almost exclusively the physical process of softening, because the hardening process does not achieve importance until a higher temperature exists such as is reached only after 10 seconds. The break from K to L depends on the reversal at D or d. The very slight drop in pressure between L and M indicates that, up to the pressure minimum, the influences of physical softening and the toughening by chemical action balance each other until the hardening process increasingly and, after reaching the mold temperature, exclusively determines, the course of the curve.

The pressure-time curve according to FIG. 3 allows important conclusions to be drawn in practice in the testing of duroplasts. Thus it may be seen, for example, from FIG. 3 that the pressure peak H, I can be avoided by preheating the composition or by slow closing of the press mold. From the whole course of the curve it is apparent that, with a specific pressure of 300 kilograms per square centimetre, a relatively difficult pressed article, corresponding to a total rod length of 60 millimetres, can be prepared and that, with appropriate preheating, about 25 seconds mold closure period is available. It may further be inferred that, by using twice the power, namely 600 kilograms per square centimetre, very difficult pressed articles, corresponding to a cylindrical rod length of 86 millimetres, are capable of being produced, and a mold closing period of 35 seconds is available.

Since it can be assumed that, after about 40 seconds, the composition still in the charging space has acquired the full mold temperature, the course of the pressure between 40 and 50 seconds is based solely on chemical processes, so that the appropriate hardening speed can be safely estimated therefrom. The period of time which elapses until, at the point N, a specific pressing power of 1,000 kilograms per square centimetre has been reached, in the present case 50 seconds from the beginning of the test or 40 seconds after the preheating of the composition, can also enable those working up a duroplast to estimate the so-called "standing period." The hardening at this point is already so extensive that it almost corresponds to that required in a serviceable pressed article. If the apparatus permits the following of the curve up to specific pressures of 1,500 to 2,000 kilograms per square centimetre, the conditions of a hardening out which is completed in a technical sense can be even more closely approximated.

Although the testing apparatus according to this invention has special utility in the testing of duroplasts, it may also serve with advantage for the convenient investigation of thermoplasts, in which case, naturally, when using a constant flow speed, there is formed by the pressure curve, after the end of the heating-up period, an approximately straight line about in the direction of the ordinates and which lies in the region of higher or lower pressure depending on the higher or lower fusion viscosity. When using adequate preheating in the charging space and using a multi-stage program after reaching the mold temperature, it is also possible in the case of thermoplasts to follow conveniently in a test the pressure changes which occur upon a sudden acceleration or retardation of the flow process.

While we have described herein some embodiments of our invention, we wish it to be understood that we do not intend to limit ourselves thereby except within the scope of the claims hereto or hereinafter appended.

We claim:

1. Apparatus for testing the working properties of hardenable plastic materials, comprising a container for a mass of plastic material having a chamber therein and a passage leading from said chamber, means associated with said passage for measuring the flow progress of the material therein, means to exert a pressure on the material in the chamber to press it into the passage, means responsive to deviations in the rate of flow from a predetermined program to control said pressure exerting means compensatively so as to restore said rate of flow to the predetermined value, and means for substantially continually measuring the pressure exerted by said pressure exerting means.

2. In a device as claimed in claim 1, means for continuously recording said pressure.

3. In a device as claimed in claim 2, means to record the flow of said material in the passage.

4. Apparatus for testing the working properties of hardenable plastic materials, comprising a container for a mass of plastic material having a chamber therein and a passage leading from said chamber, means to exert a pressure on the material in the chamber to press it into the passage, a first member movably mounted in said passage and movable by the material entering the passage, a second movable member, means to impart to said second member movement at a predetermined rate of speed, means operatively connected to said two members and responsive to differential movement thereof to control said pressure exerting means compensatively so as to maintain the relative speed of movement between the two members constant, and means for substantially continually measuring the pressure exerted by said pressure exerting means.

5. In a device as claimed in claim 4, means for continuously recording said pressure.

6. Apparatus for testing the working properties of hardenable plastic materials, comprising a container for a mass of plastic material having a chamber therein and a passage leading from said chamber, means to exert a pressure on the material in the chamber to press it into the passage, a first member movably mounted in said passage and movable by the material entering the passage, a second member mounted for rotation, means to rotate the second member at a predetermined rate of speed, a flexible member connected to the first member at one end and to the periphery of the second member at the other end, said pressure exerting means being hydraulic, a valve operatively associated with said pressure exerting means to control the same, and a part engaging said flexible member operatively connected to said valve to control the valve compensatively so as to maintain the relative speed of movement between said first and second members constant, and means for substantially continually measuring the pressure exerted by said pressure exerting means.

7. In a device as claimed in claim 6, said part comprising a roller engaging said flexible member.

8. In a device as claimed in claim 7, a weight carried by said roller, a synchronous motor carried by said roller, said valve being a sliding piston valve, and said motor having its shaft connected to the pistons of said valve to impart turning movement thereto about its vertical axis.

9. In a device as claimed in claim 8, stationary guide means operatively engaging said roller to prevent twisting of the roller while permitting vertical movement thereof.

10. Apparatus for testing the working properties of hardenable plastic materials, comprising a container for a mass of plastic material having a chamber therein and a passage leading from said chamber, means to exert a pressure on the material in the chamber to press it into the passage, means to control the pressure means so as to maintain the rate of flow of the material in the passage in accordance with a predetermined program, and means for substantially continually measuring the pressure exerted by said pressure exerting means.

11. In a process for testing the working properties of hardenable plastic materials, in which the material is subjected to a compressive force to a cylindrical passage and subjected therein to hardening conditions, the steps of comparing the actual rate of flow of the material with a predetermined programmed rate of flow, changing the compressive force in response to differences between such rates of flow so as to maintain the actual rate of flow substantially equal to the programmed rate of flow, and measuring the variations in said compressive force to determine the working properties.

References Cited in the file of this patent

UNITED STATES PATENTS

| | | |
|---|---|---|
| 989,471 | Abraham | Apr. 11, 1911 |
| 2,066,016 | Rossi et al. | Dec. 29, 1936 |
| 2,780,096 | Noble et al. | Feb. 5, 1957 |